Feb. 11, 1969          M. J. LOWDERMILK          3,427,208
EXPENDABLE THERMOCOUPLE WITH LOCATER MEANS
Filed July 26, 1965
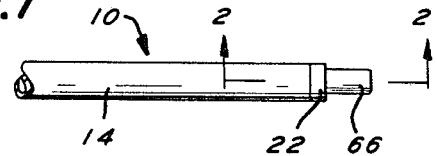
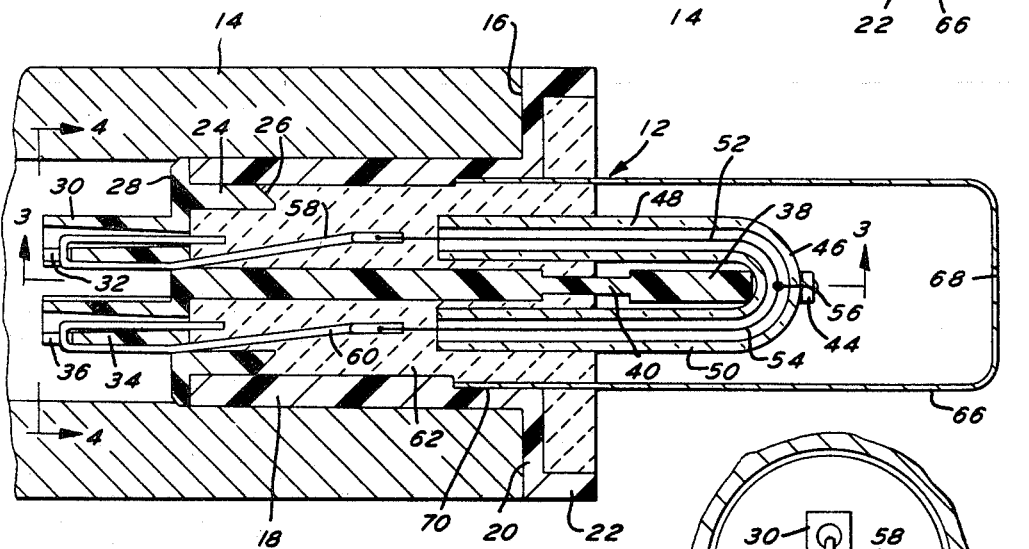
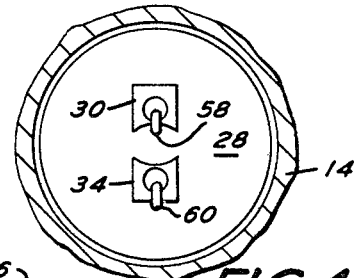
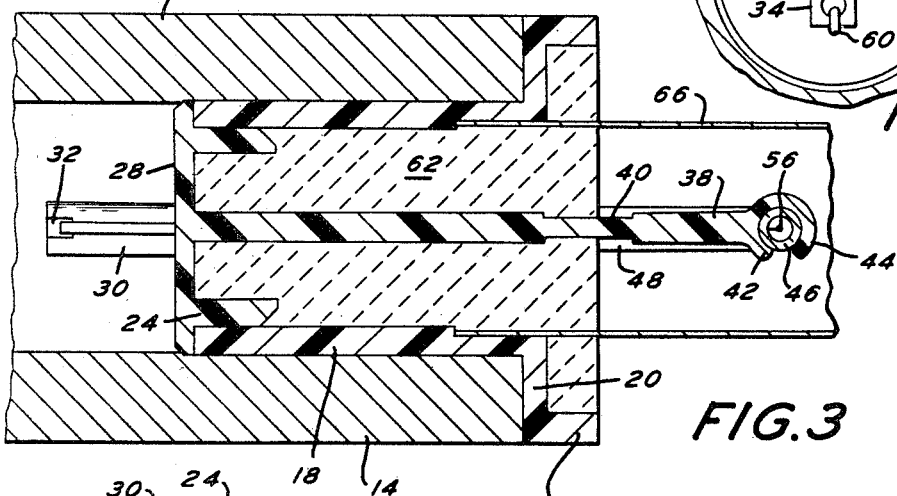
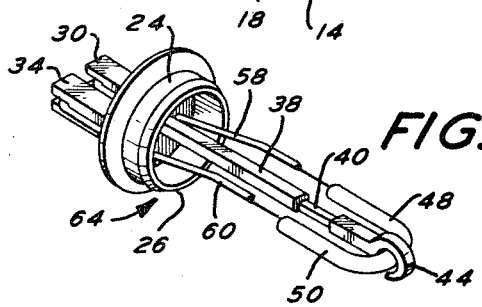
INVENTOR.
MARVIN J. LOWDERMILK
BY
Seidel & Gonda
ATTORNEYS.

{ # United States Patent Office 3,427,208
Patented Feb. 11, 1969

3,427,208
EXPENDABLE THERMOCOUPLE WITH LOCATER MEANS
Marvin J. Lowdermilk, Haddonfield, N.J., assignor to Electro-Nite Co., a corporation of Pennsylvania
Filed July 26, 1965, Ser. No. 474,618
U.S. Cl. 136—235                    5 Claims
Int. Cl. H01v 1/02

ABSTRACT OF THE DISCLOSURE

An expendable thermocouple is disclosed mounted on one end of an expendable tube. The thermocouple unit includes a centrally located post which embraces a portion of a thermocouple protection tube to preposition the thermocouple hot junction a specified distance from a support for the post.

---

This invention relates to a thermocouple, and more particularly to an expandable thermocouple assembly and/or unit.

The present invention is directed to a thermocouple unit and/or assembly structurally interrelated in a manner which facilitates mass production at minimum cost. At the same time, the invention utilizes a minimum number of components. The thermocouple unit includes a U-shaped vitreous tube having its free end imbedded in a body of ceramic material. A locater means is projected from an end of the ceramic material to the bight of the U-shaped tube to assure uniformity in the location of the thermocouple hot junction. Preferably, the locater means embraces the bight of the U-shaped tube and is coupled to a non-directional electro-mechanical connector. The structural interrelationship between the locater means and the said connector provides for a subcombination facilitating ease of assembly and production.

The ceramic material may be surrounded by a housing capable of being mass produced by a method providing dimensional stability. Preferably, the material is a polymeric material such as polypropylene or polyethylene which may be injection molded. The housing is preferably provided with a radially outwardly directed flange. The housing of the thermocouple unit is adapted to be force-fitted in one end of an expendable lightweight tube made from a material such as cardboard. The thusly-formed thermocouple assembly is adapted to be immersed in a molten bath to measure the temperature of the same.

To facilitate immersion of the assembly into a molten bath, the assembly is supported at one end of a lance. To facilitate an electro-mechanical connection to contacts on one end of the lance, the above-mentioned connector of the thermocouple unit is disposed within said tube. The distance from said connector to the immersible end of the tube is on the order of several inches.

It is an object of the present invention to provide a novel thermocouple unit.

It is another object of the present invention to provide a novel thermocouple assembly.

It is another object of the present invention to provide an expendable thermocouple unit having a locater means for positively positioning the thermocouple hot junction.

It is another object of the present invention ot provide an expendable thermocouple unit capable of being mass-produced with a minimum number of components while assuring uniformity in location of the thermocouple hot junction.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a side elevation view of the immersible lance portion of a thermocouple assembly.

FIGURE 2 is a sectional view taken along the line 2—2 in FIGURE 1, and illustrated on a greatly enlarged scale.

FIGURE 3 is a sectional view taken along the line 3—3 in FIGURE 2.

FIGURE 4 is a view taken along the line 4—4 in FIGURE 2.

FIGURE 5 is a perspective view of an intermediate subassembly utilized in manufacturing the thermocouple unit.

Referring to the drawing in detail, wherein like numerals indicate like elements, there is illustrated in FIGURE 1 an immersible end portion of a thermocouple assembly in accordance with the present invention designated generally as 10.

The assembly 10 includes a thermocouple unit designated generally as 12 force-fitted in the immersible end of a lightweight expendable tube 14 having an end face 16. The tube 14 may be made from a commercially available material such as cardboard or the like.

The unit 12 includes an outer cylindrically constructed body 18. Body 18 is preferably made from a material having good dimensional stability and capable of being mass-produced at a low cost. It has been found that the body 18 may be injection molded from a polymeric material such as polypropylene to thereby meet these requirements. The body 18 is provided with an integral radially outwardly directed flange 20 which overlies the end face 16. A flange 20 terminates in an axially directed lip 22. The lip 22 as illustrated has a diameter corresponding to the outer diameter of the tube 14. The outer diameter of body 18 is sufficiently large so as to insure a good force-fit with the inner diameter of tube 14.

The body 18 is provided with a removable end wall. The end wall includes a base 28 of sufficient diameter so as to overlie the adjacent end face of the body 18. The base 28 is provided with an axially directed annular ring 24 which is integral therewith. The ring 24 is provided with a beveled face 26 on its free end. Face 26 is beveled outwardly so as to converge toward the plane of the base 28. Face 26 facilitates ease of insertion of the ring 24 into the body 18 for retention therein by a force-fit.

The base 28 is provided with integral projections 30 and 34. The projections 30 and 34 project axially in the opposite direction from the direction of projection of ring 24. The projections 30 and 34 are hollow and have their interior communicating with the interior of the body 18 by way of a hole in the base 28 aligned therewith.

The projection 30 terminates at its free end in a notch 32. The projection 34 is likewise provided with a notch 36. The juxtaposed surfaces of the projections 30 and 34 are concave as illustrated more clearly in FIGURE 4. The notch 32 is positioned along the concave wall on the projection 30. The notch 36 is positioned diametrically opposite the concave wall on projection 34. The hollow interior of the projections 30 and 34 is tapered in a direction toward the plane of the base 28. The purpose of the notches 32 and 36 will be made clear hereinafter.

A locater means such as a post 38 is integral with the end wall and projects in an axial direction parallel to the longitudinal axis of ring 24. The post 38 is provided with a reduced cross section portion 40 intermediate its ends. The end of post 38 remote from base 28 terminates in a pair of jaws 42 and 44. The end wall 28 and post 38 are made from a flexible polymeric material such as polypropylene. Hence, the post 38, base 28, and the pro-} jections 30 and 34 may be molded as one integral unit having good dimensional stability.

The jaws 42 and 44 at the end of post 38 are sufficiently flexible so that they may be spread apart and positioned to embrace the bight of a U-shaped vitreous tube. The U-shaped tube is provided with legs 48 and 50. The U-shaped tube may be made from a material such as quartz, Vycor, glass, etc.

Conventional thermocouple elements 52 and 54 are provided within the U-shaped tube. One of the ends of the elements 52 and 54 is connected together to form a hot junction 56 in a conventional manner. The hot junction 56 is positioned at the bight 46. The other ends of the elements 52 and 54 extend through the free ends of the legs 48 and 50. The element 52 is fixedly connected to one end of a lead 58. The element 54 is fixedly connected to one end of a lead 60. The lead 58 extends through a hole in the base 28 and then along the concave wall on the projection 30. Thereafter, a portion of the lead 58 is bent so as to extend through the notch 32 and through the hollow projection 30. The lead 58 is of sufficient length so that it is preferably provided with its free ends within the body 18.

The lead 60 extends through a hole in the base 28 and along the wall on the projection 34 diametrically opposite the concave wall thereon. The lead 60 is bent so as to extend through the notch 36. From the notch 36, the lead 60 extends generally axially through the projection 34. The lead 60 is likewise of sufficient length so that its ends are disposed within the housing 18.

The thermocouple elements 52 and 54 may be of the fine-wire type conventionally utilized heretofore. For purposes of illustration, element 52 may be platinum and element 54 may be platinum-rhodium. Those skilled in the art will understand that if element 52 is platinum, the lead 58 will be made from a commercially available copper-nickel alloy and lead 60 will be made from copper. When the material of the thermocouple elements is changed, a corresponding change in the nature of the material for the leads 58 and 60 will likewise be changed to provide the desired end result.

In FIGURE 5, there is illustrated a perspective view of a subassembly designated generally as 64. The subassembly 64 comprises the components described above which may be preassembled. Thereafter, the subassembly 64 may be inserted into the cylindrical body 18 with a force-fit between the inner periphery of body 18 and the outer periphery of ring 24. Thereafter, a ceramic cement 62 may be poured into the body 18 to a sufficient height so as to be flush with the free end of the lip 22. The ceramic cement 62 will envelop the free ends of the legs 48 and 50 as well as the cold junction between the thermocouple elements and the leads 58 and 60. Both ends of each of the leads 58 and 60 will be imbedded in the ceramic cement 62. The nature of the cement 62 is well-known to those skilled in the art and need not be described in detail. Cement 62 is a heat and electrical insulator and should be fast drying.

A cup-shaped cap 66 is provided. Cap 66 may be made from lightweight steel or copper or any other desired alloy. Cap 66 surrounds the U-shaped tube. Cap 66 is provided with a hole 68 in its base. The inner periphery of housing 18 is provided with a bore 70 so as to provide a shoulder therebetween. Before the cement 62 hardens, the cap 66 is introduced into the cement 62 until its rests on the last-mentioned shoulder. The bore 70 thereby provides a guide and support for the cap 66 so that it projects from the end face of the unit 12 for a uniform distance.

The ceramic cement 62 overlies the flange 20. The level of the cement 62 is such that the cement envelops a portion of the reduced cross section portion 40. The length of the post 38 is chosen so that portion 40 will be partially within the cement 62 and partially projecting in an axial direction from the cement 62. Also, the length of the post 38 is chosen so that the hot junction 46 may be uniformly positioned a distance of between ⅜ and ½ inch from the end face of the lip 22 which has a specified distance from the face 16 on the cardboard tube 14.

The manner in which the thermocouple unit 12 is utilized facilitates manufacturing the same as a subassembly for shipment to a distant location wherein it may be assembled to the tube 14 if desired. The manner in which the thermocouple assembly is utilized is well-known to those skilled in the art and does not need to be described in detail. The cap 66 generally melts when the unit is passing through slag and thereby provides protection for the U-shaped tube. The portion 40 on the post 38 minimizes heat transfer into the interior of the ceramic cement 62. The concave walls on the projections 30 and 34 facilitate receiving a circular or cylindrical connector element on the lance which will make contact with the juxtaposed exposed portion of lead 58. The projection 34 is orientated so as to be received within a cylindrical or ring-shaped contact on the lance. The ring-shaped contact on the lance is adapted to cooperate with the juxtaposed exposed portion of the lead 60. Hereinafter, the projections 30 and 34 and the manner in which they present exposed portions of the leads 58 and 60 may be referred to as a non-directional contact. That is, the proper electro-mechanical contact will be provided regardless of the angular orientation of the unit 12 with respect to the contacts at the end of the lance. Since both ends of the leads 58 and 60 are embedded within the ceramic cement 62, there is a less likely chance that the leads will become separated and interfere with ease of manipulation of making and breaking contact with the lance.

In addition, the non-directional connector does not present any free ends of wires or the like which may become dislodged and interfere with a proper electro-mechanical connection.

The present invention may be embodied in other specific forms without departing from the spirit or essential attributes thereof and, accordingly, reference should be made to the appended claims, rather than to the foregoing specification as indicating the scope of the invention.

I claim:

1. An expendable thermocouple comprising a lightweight expendable tube, a thermocouple unit mounted in one end of said tube, said unit including a body of ceramic material enveloping the ends of a U-shaped vitreous tube, a housing between said ceramic material and said expendable tube, a discrete bottom wall for said housing, said bottom wall having an axially directed portion telescopically coupled to said housing, thermocouple elements in said vitreous tube having a hot junction at the bight of said vitreous tube, leads connected to said elements within said ceramic material and extending through said bottom wall, locater means projecting from one end of said ceramic material and embracing at least a portion of said bight to position said bight a desired distance from said bottom wall, said locater means being connected at one end to said bottom wall and centrally positioned in said housing, and means on said housing to orientate said bottom wall with respect to said one end of the expendable tube, whereby the hot junction on mass-produced assemblies may be uniformly located with respect to said one end of the expendable tube, said housing and said locater means being coaxial.

2. An expendable thermocouple in accordance with claim 1 wherein said locater means is of reduced cross section at the area where it projects from said ceramic material as compared with its cross section at the location wherein it is connected to said bottom wall.

3. An expendable thermocouple comprising a lightweight expendable tube, a thermocouple unit mounted in one end of said tube, said unit including a body of ceramic material enveloping the ends of a U-shaped vitreous tube, thermocouple elements in said vitreous tube having a hot junction at the bight of said vitreous tube, leads connected to said elements within said ceramic material, locater means projecting from one end of said ceramic material to said bight to position said bight a desired distance from the end of said expendable thermocouple tube, whereby the hot junction on mass-produced assemblies may be uniformly located with respect to said end of said expendable tube, and connector means providing a non-directional coupling at the other end of said ceramic material, said connector means including two hollow spaced projections extending axially away from said ceramic material, one of said projections having a concave exterior wall, and one of said leads having a portion extending along said concave wall.

4. A thermocouple unit comprising a body of ceramic material, a U-shaped tube having its ends within said ceramic material, thermocouple elements within said tube connected to form a hot junction at the bight of the tube, a pair of leads, each element projecting through one of the legs of the tubes and connected to one of the leads within said ceramic material, means providing a non-directional connector for providing an electro-mechanical connection with a lance, said connector means being adjacent one end of said ceramic material which is remote from said tube, said connector means supporting an electrical contact portion of each lead in an exposed disposition, said connector means including two hollow spaced projections extending axially away from said ceramic material, one of said projections having a concave exterior wall adjacent the longitudinal axis of the ceramic material, one of said leads having a portion extending along said concave wall, and locater means projecting from the other end of said ceramic material to said bight to position said bight a desired distance from said connector means.

5. A unit in accordance with claim 4 wherein said locater means is a post, the end of said post which is remote from said ceramic material terminating in a flexible jaw for partially embracing said bight, and said post having a reduced cross section at the area where it emerges from said ceramic material as compared with its cross section for a remainder of the post within said material.

References Cited

UNITED STATES PATENTS

| | | | |
|---|---|---|---|
| 2,007,942 | 7/1935 | Braselton | 313—222 X |
| 3,246,520 | 4/1966 | Gaskill et al. | 136—234 X |
| 3,275,874 | 9/1966 | Jennings | 313—222 X |
| 3,298,874 | 1/1967 | Davies | 136—242 X |

FOREIGN PATENTS 1,361,573   4/1964   France.

WINSTON A. DOUGLAS, *Primary Examiner.*

MELVYN J. ANDREWS, *Assistant Examiner.*